United States Patent [19]
Van Overveld et al.

[11] Patent Number: 6,057,843
[45] Date of Patent: May 2, 2000

[54] METHOD AND DEVICE FOR VISUALIZING ON A TWO-DIMENSIONAL SCREEN A HIERARCHICAL INFORMATION STRUCTURE BASED ON NODES INTERCONNECTED BY EDGES, THROUGH FISHEYED REPRESENTATION OF NODES

[75] Inventors: Cornelis W. A. M. Van Overveld; Erik A. J. Peeters; Jaco W. Schoonen, all of Eindhoven, Netherlands

[73] Assignee: U.S. Philips Corporation, New York, N.Y.

[21] Appl. No.: 09/060,084

[22] Filed: Apr. 14, 1998

[30]  Foreign Application Priority Data

Apr. 18, 1997 [EP] European Pat. Off. ............... 97201144

[51] Int. Cl.[7] ........................................................ G06F 5/00
[52] U.S. Cl. ............................................. 345/357; 345/355
[58] Field of Search ...................................... 345/333, 339, 345/353, 355, 356, 357

[56]  References Cited

U.S. PATENT DOCUMENTS 5,546,529  8/1996  Bowers et al. ............................ 345/355
5,555,354  9/1996  Strasnick et al. ......................... 345/355
5,786,820  7/1998  Robertson ................................ 345/357

OTHER PUBLICATIONS

Published in *Human Factors in Computing Systems,* "Generated Fisheye Views", George W. Furnas, CHI 1986.

*Primary Examiner*—John E. Breene
*Assistant Examiner*—Cao H. Nguyen
*Attorney, Agent, or Firm*—Gregory L. Thorne

[57] ABSTRACT

For visualizing on a two-dimensional screen a hierarchical information structure that is based on nodes interconnected by edges, first an actual root node is selected. The root node is visualized on the screen as a fisheyed representation of a root node block. Downstepping will at one or more next-lower hierarchical levels select a descendant node of the actual root node for display. At each downstepping the representation is divided along alternatingly at least a first and a second coordinate direction into lower level visual slices, of which the selected descendant is placed in a central part of the fisheye. Finally, access is allowed to at least one node of the graph whose image is displayed within the actual fisheye.

11 Claims, 5 Drawing Sheets

METHOD AND DEVICE FOR VISUALIZING ON A TWO-DIMENSIONAL SCREEN A HIERARCHICAL INFORMATION STRUCTURE BASED ON NODES INTERCONNECTED BY EDGES, THROUGH FISHEYED REPRESENTATION OF NODES

BACKGROUND OF THE INVENTION

The invention relates to a method for visualizing on a two-dimensional screen a hierarchical information structure which is based on nodes that are interconnected by edges. Such method is particularly intended for large information structures. Often, the structure is visualized as a tree, and may then be formatted for example as a menu. Stepping, selecting and accessing procedures in such structure are straightforward. An advantage of the treemap is that a large number of nodes can be displayed simultaneously. A disadvantage is however that display space for each respective node is extremely limited. It would be advantageous if display space were increased, in particular with respect to an actually selected node, and if feasible, also for such nodes that would be closely connected to the node actually selected. This extended space can be used for inserting text, animation and other image material that could enable a user person to access the information structure in a quick and sensible manner. Moreover, the visual image should instruct the user as to the still-existing references to the environment of the selected node in a natural and appealing manner.

SUMMARY TO THE INVENTION

In consequence, amongst other things, it is an object of the present invention to present a visualizing method that gives a user a natural feel of the consistencies inside the structure, while at the same time maintaining a more or less uniform format during downstepping, and possibly upstepping, through the structure. Now therefore, according to one of its aspects the invention is characterized by the further steps recited in claim 1. The fisheye feature presents a natural feel to a user, allows to enhance the representation of actuality within the structure, and is also felt as aesthetically pleasing.

Advantageously, the method uses at least three coordinate directions. Using the third, or Z-dimension further extends the applicability of the method of the invention.

Advantageously, the method provides a size warp mechanism among a plurality of visual slices that are located on a single hierarchical level, and descend from a common origin node on a higher level. This feature allows a flexible selecting whilst remaining on a single level.

The invention also relates to a device arranged for practising the method according to the invention. Further advantageous aspects of the invention are recited in dependent Claims.

BRIEF DESCRIPTION OF THE DRAWING

These and further aspects and advantages of the invention will be discussed more in detail with reference to the disclosure of preferred embodiments hereinafter, and in particular with reference to the appended FIGURES that show.

DETAILED DESCRIPTION OF PREFERRED EMBODIMENTS

Figure 1A:
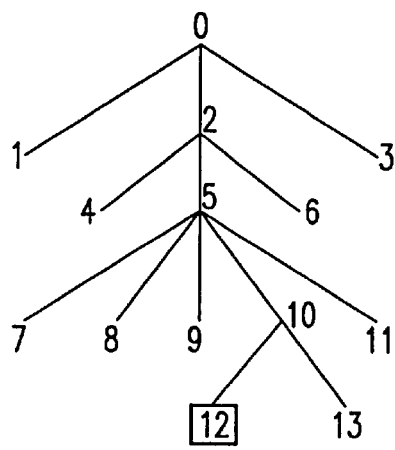
FIG. 1A, an exemplary tree.

FIG. 1A shows an exemplary tree structure, with nodes 0–13. Herein, node 0 is the overall root node. The first next lower level has nodes 1–3; the second next level has nodes 4–6, the third next level has nodes 6–11, the fourth level has nodes 12–13, all of these nodes being interconnected as shown. As shown, a great number of nodes can be visually distinguished in parallel, so that the internal structure of the treemap is immediately apparent. However, the space available for each respective node is evidently small, so that little or no further information can be joined to each node, unless the user accesses just one single node. As will be apparent hereinafter, the invention may be applied in a broader category of information structures. First, the structure may be a directed acyclic graph, which in the invention can be realized through representing each node as many times as it has parents. In principle, even cyclic structures would not be ruled out, as will be apparent hereinafter.

Figure 1B:
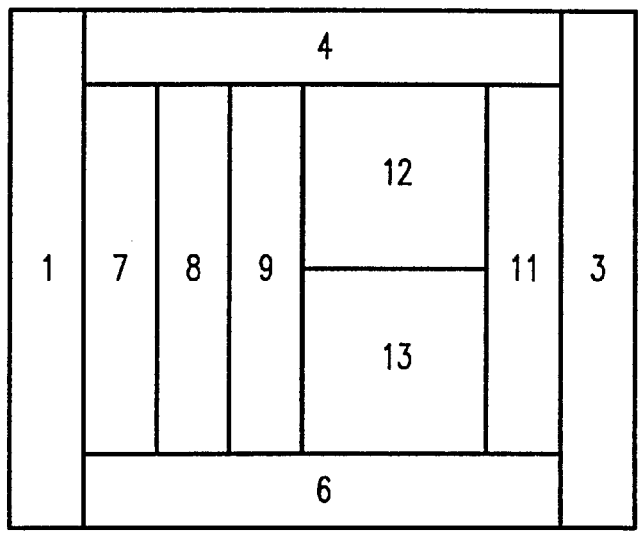
FIG. 1B, the associated treemap structure.

FIG. 1B is the treemap structure associated to the tree of FIG. 1A. Here, each leaf of the tree is represented by a rectangle. Clearly, the uppermost set of leaves contains leaves 1 and 3, and a composite entity that eventually terminates in leaves 4, 6, 7, 8, 9, 11 and 12. The further mapping is evident through comparing with FIG. 1A.

Figure 2:
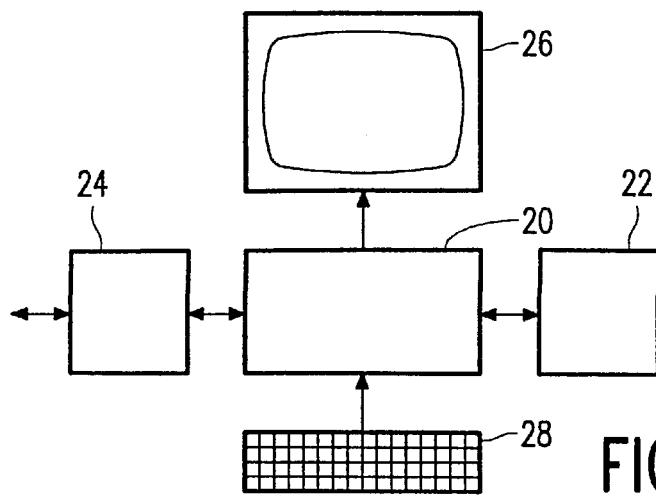
FIG. 2, a device for practising the inventive method.

FIG. 2 shows a device for practising the inventive method. Block 20 represents the central data processing facility. This part is respectively interconnected clockwise to display facility 26, local memory facility 22, keyboard facility 28, and I/O facility 24 that interfaces to the outside world. Other items may be added, such as a mouse, fixed and/or removable disk memories, a speech channel, etcetera. Their various properties do not however immediately influence the feasibility of the system.

FIGS. 3–10 show various fisheyed database visualizations of the tree structure that is represented in FIG. 1A. When a user starts navigating through the information structure, only a single plain cube is represented, that represents the root node of the entire information structure; this cube may either have straight edges, or rather be already deformed through fisheye technology as will be discussed hereinafter with reference to FIGS. 3–10. The fisheye format is produced in that the central part of the image is made subject to a first magnification factor in both screen coordinate directions. The magnification factor in a particular direction falls off as the distance in this direction to the centre of the image increases. The exact expression for the associated function is a matter of choice. Eventually, the image looks as if viewed through an optical loupe.

Figure 3:
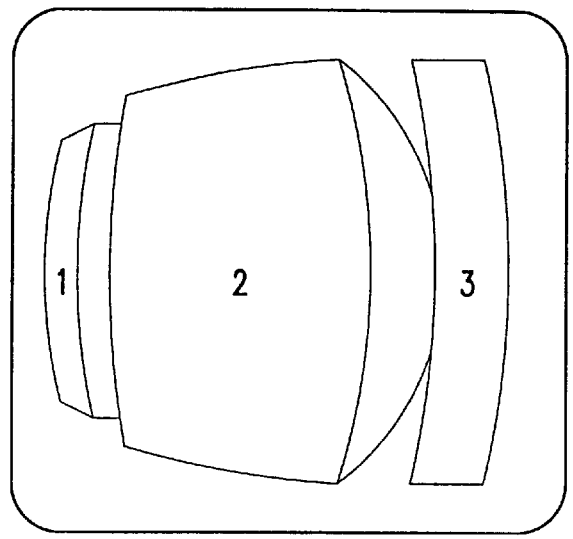
FIGS. 3–10, various fisheyed database visualizations.
Figure 4:
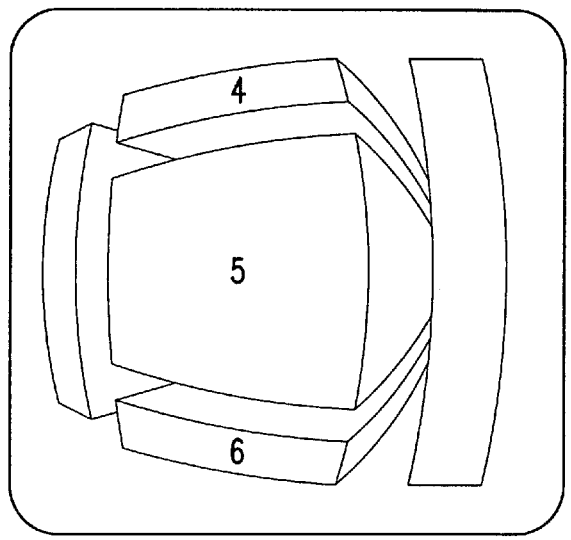

Now, the user can refine the original cube to see more details, which may be effected for example by clicking on the image of node 0, which then leads to the image of FIG. 3. Of course, other user interface definitions are feasible, such as keying a highlighted character pertaining to a particular node or keying an associated node number. In FIG. 3, a horizontal row of blocks is displayed. In particular, block 2 has a relatively large size through using the fisheye principle, whereas neighbouring blocks or visual display slices 1 and 3 are positioned along a horizontal row, and are displayed in a narrower and rather curved manner. Further clicking can now be done on node 2, which leads to the image of FIG. 4. Here, all descendant nodes of node 2 are shown as being arranged along a more or less vertical direction, with node 5 in a central position and relatively enlarged through the fisheye effect, whereas nodes 4 and 6 are represented as relatively narrower visual slices. Of course, instead of clicking on node 2, also clicking on nodes 1 or 3 is feasible for calling nodes that would descend from these latter nodes. A first click will move the other node to the fisheye centre, a second click will refine the central node. Still without further movement of the fictitious camera, clicking on node 5 will present FIG. 5 that reveals nodes 7 through 11.

Figure 5:
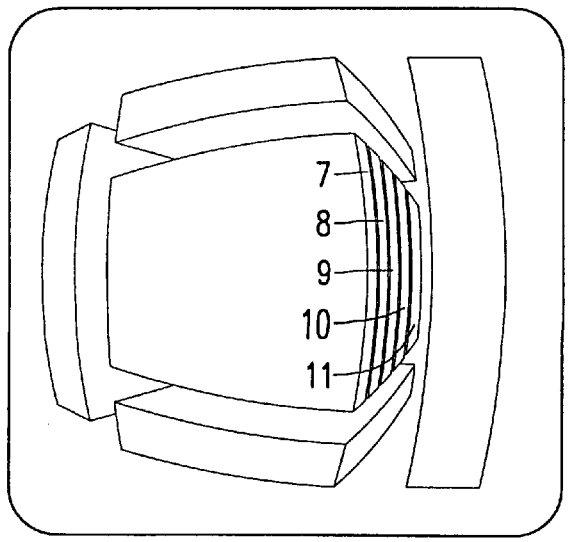
Figure 6:
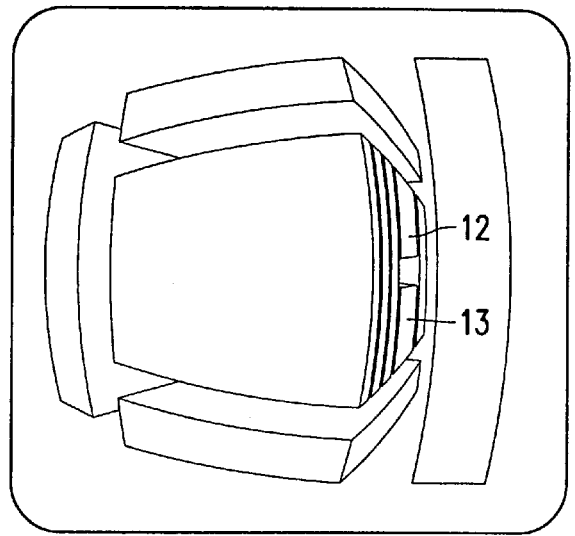

In a first realization, these nodes could be arranged again along a horizontal axis in a similar manner as blocks 1, 2, 3 in FIG. 3. Then the original blocks 1 and 3 could either be suppressed or rather, retained in their original configuration, but being further narrowed. In the format of FIG. 5 however, the row of blocks or visual slices is now represented in the Z-direction. Of this row, the foremost blocks are represented at a larger format than the ones behind. Clearly, the maximum number of blocks that can be displayed simultaneously in the latter mode is rather limited. If necessary, the system could offer an option for deleting particular blocks that would more or less obscure another block the user might want to access.

Navigating in the opposite direction from discussed supra may be effected by using the return key of the processor. It would also be feasible to select other nodes, such as node 3 in FIG. 3. In this manner, the whole data structure can be visualized in a straightforward manner. Stepping down with greater strides than a single level may be effected by keying two node numbers in quick succession. However, the preferred method of such accessing is with a mouse device: everything visible may be clicked at.

Figure 7:
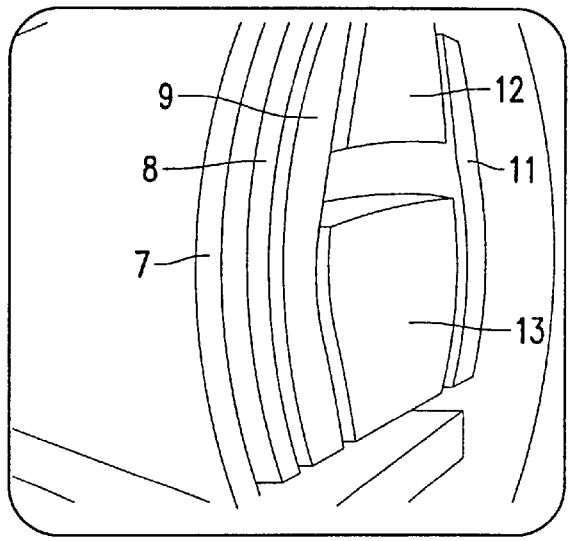
Figure 8:
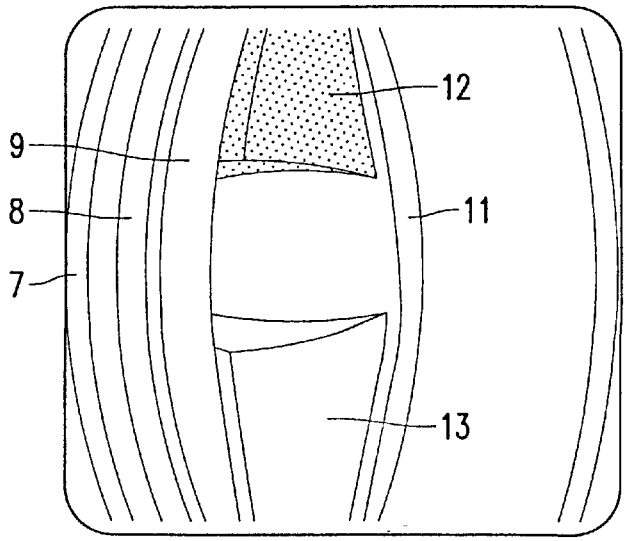
Figure 9:
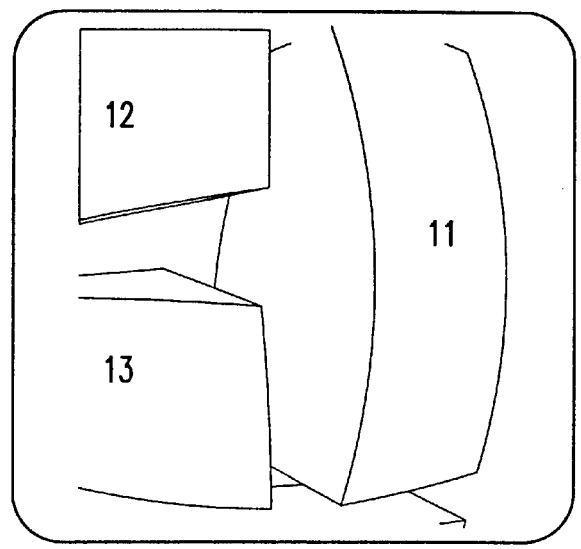
Figure 10:
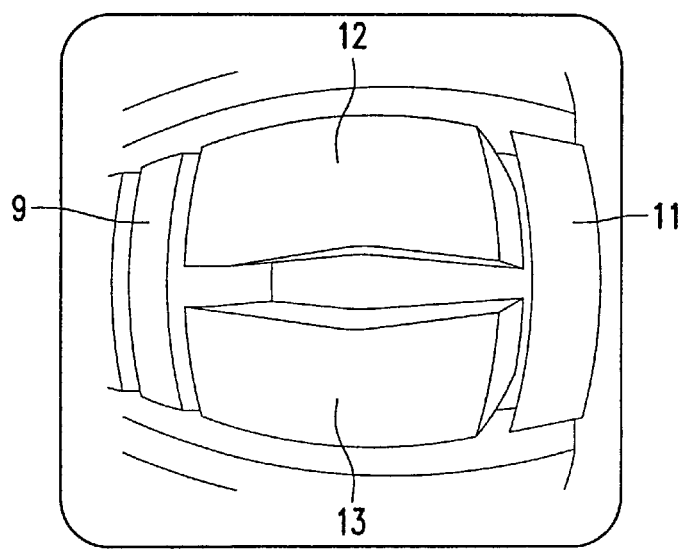

FIGS. 6–10 show features produced by further stepping down in the hierarchy, in particular, while further exploiting the possibilities in the third dimension. In FIG. 7 we see the focus at the refined node 10, that has nodes 12 and 13 as its descendants in FIG. 1A. Among the nodes now focused on, the user person is able to select a further node. This time, the camera will zoom in to node 10, and then turn left by rotating along a vertical axis. Various successive stages of this turning are shown in FIGS. 8, 9, 10. After the rotating, the picture is similar to FIG. 4. If the tree structure would have a still larger depth, the user could proceed further in the way described above, in which alternatingly in one of the two or three possible dimensions a row of visual slices is displayed.

Further, for node 12 that is a leaf node of the tree, extra information may be requested, which information may be displayed in a pop-up window; of course, such information may also be provided for other, non-leaf nodes. When looking at the tree structure, the focus of node 10 is two levels lower in the tree than the previous one (2). Now, if the camera orientation would change all the time, the user might get confused. To keep similar views, the camera would have to rotate along a horizontal axis, which was found less appealing to a user. Zooming on two different levels at a time has the advantage that the camera only zooms and rotates. These rotations are around a vertical axis. Another advantage of zooming on two levels at a time is that the user will be able to browse through the tree faster than in other visualizations, because there is no need to step through every level. FIGS. 7–10 show how the camera zooms in and then turns left to get a picture similar to the one we had started with.

If the display changes too fast on selection of a node, a user might need some time to adjust to the changed situation. Smooth animated transitions have proven useful to render visual changes more comprehensible. All camera and zooming movements will therefore be animated in small steps. There are solutions in that a user may want to change the view in a manner that is different from what has been described above. For example, there should be a way to zoom back out again, and if the user selects one of the nodes at the edge of the screen, it is preferred that this node is moved towards the centre of the screen to remove the distortion. Several options for this problem are feasible.

It should be clear that the above procedures to a certain extent may be used in information structures that have loops. First, an entry node must be defined in an unequivocal manner. Next, when selecting a node that has more than one parent, a separate copy of that node is created exclusively for the selecting, while the node remains in a separate manner in the network as well. Such copies are destroyed when returning to the entry node. When upstepping through the network, always the way followed earlier downward is retraced, without considering other copied nodes next to the ones that had been selected already. Further, the structure may provide a mechanism to select a more or less arbitrary node as actual root node.

Figure 11:
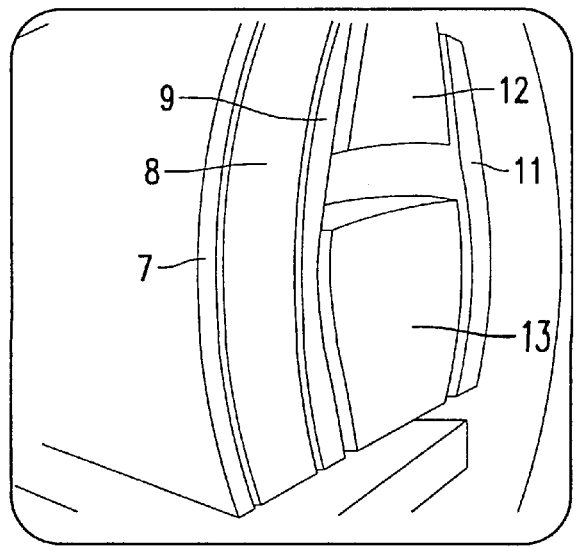
FIG. 11, features generated by introducing warping.
Figure 12:
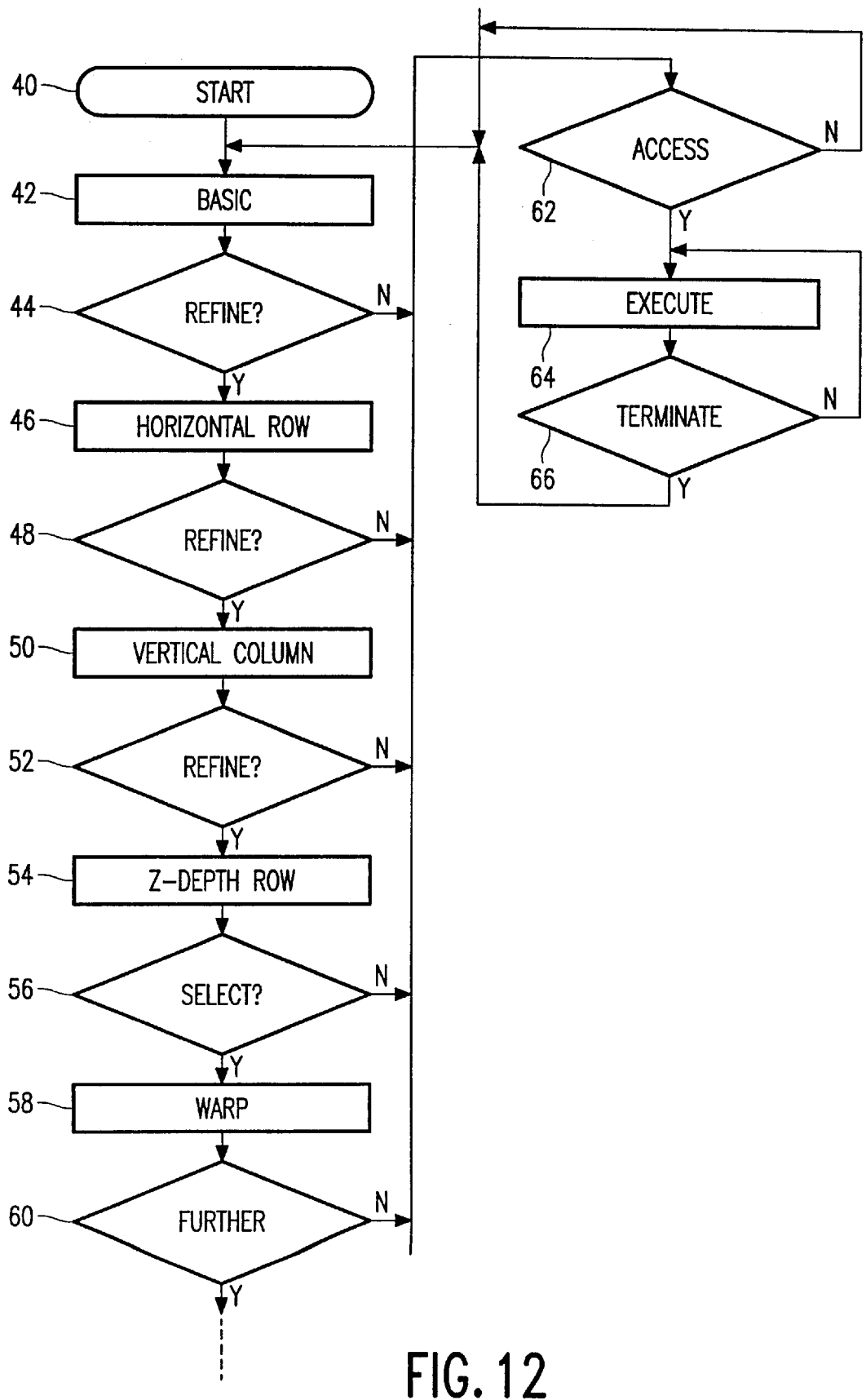
FIG. 12, a flowchart of the method.

FIG. 11 introduces so-called warping of the image. This concept solves the problem that visual slices 'behind' the front one of their row are pretty nearly out of sight. In the example, node 8 has been made "thicker" than neighbouring nodes 7 and 9. In this way, a user is allowed to move a focus through the displayed set of nodes. This focus will be drawn larger and the others will be compressed (or extended) to allow the current focus to be readable to an improved degree. Moreover, the warp focus will also be refined. Of course, the warp feature may be also employed amongst a row of nodes that is parallel to the screen plane.

FIG. 11 is an exemplary flowchart of the method, illustrating a possible dialogue. In block 40 the procedure is started, and the necessary hardware and software facilities may be claimed. In block 42, the origin node is displayed. In block 44, the refining or downstepping action is detected. If positive, the next lower level (FIG. 3) is displayed in block 46. Further refining actions are detected in blocks 48, 52, 56, 60, . . . Block 50 displays the vertical column of FIG. 4, block 54 the row of visual slices in the third dimension according to FIG. 5, block 58 the rotating of the line of viewing according to FIGS. 7–10. Absent a request for refining to the next more specific level (negative outputs of blocks 44, 48, 52, 56, 60), the system detects any request for accessing the information associated with a particular node in block 62. If positive, the information is presented in block 64. In block 66, the termination thereof is detected. If negative, the execution proceeds. If positive, the entry node is again displayed in block 42, which could also happen if after some delay no access request has been detected. For simplicity, the ultimate termination of the application has not been shown. Further, it is not an express restriction that the user would have to restart at all times at the root node.

What is claimed is:

1. A method for visualizing on a two-dimensional screen a hierarchical information structure which is based on nodes that are interconnected by edges, said method being characterized by the steps of:

selecting an actual root node, and visualizing the root node on the screen as a fisheyed representation of a root node block, through downstepping selectably displaying at one or more next-lower hierarchical levels a descendant node of said actual root node, whilst at each downstepping dividing said representation along alternatingly at least a first and a second coordinate direction into lower level visual slices, of which said selected descendant is placed in a central part of the fisheye, and allowing to access at least a central node of the actual fisheye.

2. A method as claimed in claim 1, using at least three coordinate directions.

3. A method as claimed in claim 1, and providing a size warp mechanism among a plurality of visual slices that are located on a single hierarchical level, and descend from a common origin node on a higher level.

4. A method as claimed in claim 1, for use in a tree network.

5. A method as claimed in claim 1, and allowing multi-level downstepping in said hierarchic information structure.

6. A method as claimed in claim 1, and allowing reversible stepping between hierarchically different levels in said information structure.

7. A method as claimed in claim 1, and having a root selection mechanism for selectively designating a particular node as actual root node.

8. A method as claimed in claim 1, wherein the fisheye is unsymmetric with respect to physical edges of said screen.

9. A method as claimed in claim 1, and providing an option to selectively and temporarily remove a node that would obscure a particular other node.

10. A device arranged for executing a method as claimed in claim 1.

11. The method as claimed in claim 1, wherein the central part of the fisheye is subject to a first magnification factor.

* * * * *